(No Model.)
H. C. NEER.
CHURN.
No. 292,133. Patented Jan. 15, 1884.
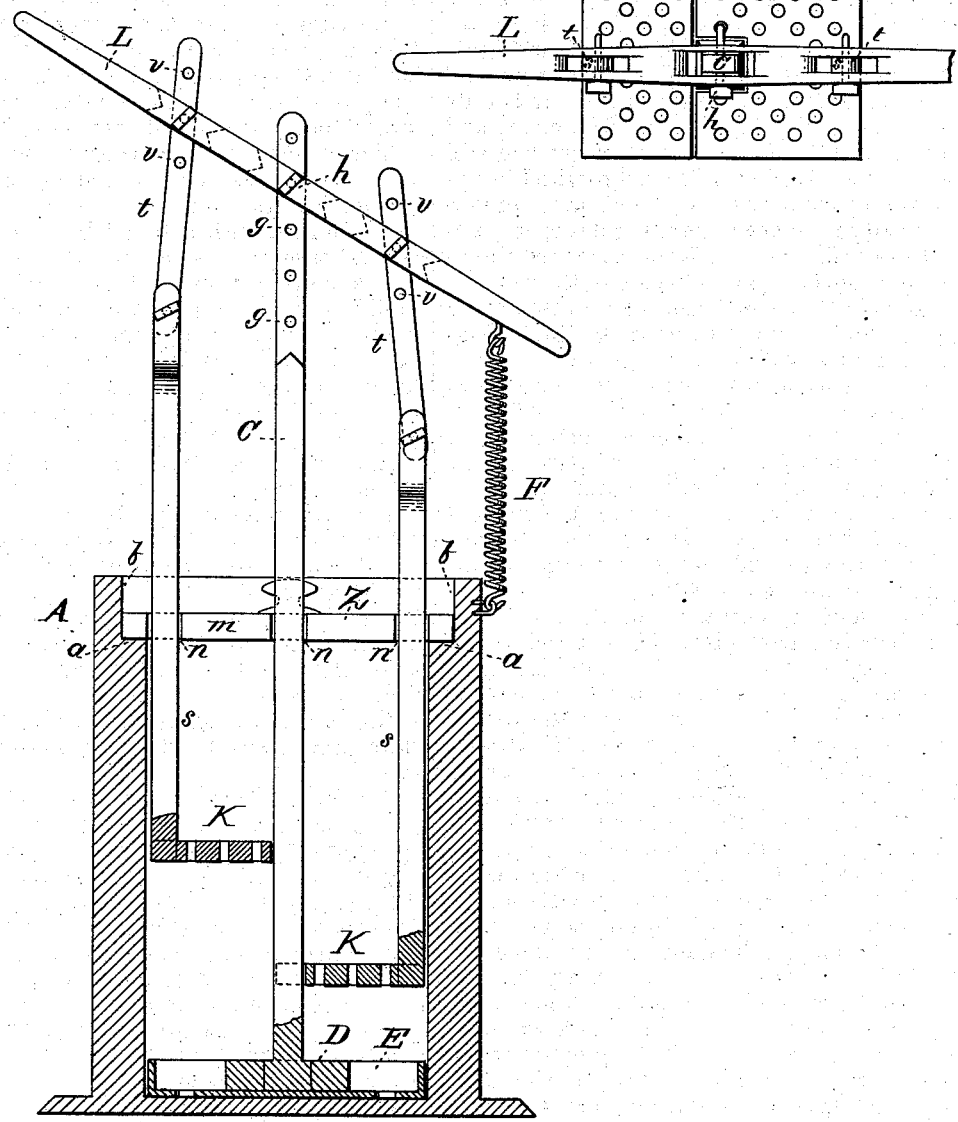
WITNESSES
Villette Anderson
E. H. Bates
INVENTOR
Henry C. Neer,
by Anderson & Smith
his ATTORNEYS

UNITED STATES PATENT OFFICE.

HENRY C. NEER, OF BRECKENRIDGE, ILLINOIS, ASSIGNOR OF ONE-HALF TO GEORGE L. FURROW, OF SAME PLACE.

CHURN.

SPECIFICATION forming part of Letters Patent No. 292,133, dated January 15, 1884.

Application filed June 4, 1883. (No model.)

*To all whom it may concern:*

Be it known that I, HENRY C. NEER, a citizen of the United States, resident at Breckenridge, in the county of Sangamon and State of Illinois, have invented certain new and useful Improvements in Churns; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a vertical section. Fig. 2 is a top view without the case.

This invention has relation to double-acting reciprocating churns; and it consists in the construction and novel arrangement of parts, as hereinafter set forth, and particularly pointed out in the appended claim.

In the accompanying drawings, A designates the churn-case, having interior ledges, $a$ near its top, the side walls extending, as indicated at $b$, above the ledges $a$.

C represents a central stem, secured at its lower end to a base-piece, D, to which is attached the perforated bottom pan, E, which is designed to rest on the bottom of the churn-case, the stem C extending above the top of said case, as shown. When the stem is drawn upward out of the case, the bottom pan is drawn up with it, thereby furnishing a means for removing the butter after churning.

The upper end of the stem C is provided with a series of perforations, $g$, for the reception of the fulcrum-pin $h$, whereby the operating-lever L is connected to said stem. The lever is therefore adjustable up or down according to requirement, its position being varied to suit the quantity of milk in the churn.

K K represent the dashers, which are provided with stems $s$, and are designed to work in alternate manner up and down in the case, one on each side of the central stem, C. The stems $s$ of the dashers are, by means of pivoted connecting arms or strips $t$, connected to the arms of the lever L. In each strip $t$ is formed a series of perforations, $v$, to facilitate the adjustment of the dashers with reference to the quantity of milk in the churn.

The object of the recess in one of the dashers K is to receive the stem C and bring the inner edges of the dashers near together when they are reciprocated, so that the agitation as the dashers pass will be greater at the passing-point than if an open space were left between them throughout their lengths.

The cover Z is composed of two sections, $m\ m$, which rest on the ledges $a$, and abut along a central line, their meeting edges being provided with notched bearings $n$ for the central stem, C, and for the dasher-stems $s$.

A spring, F, may be connected to one side of the churn-case, and extend upward for connection to one of the arms of the lever L, to facilitate the operation of the churn with one hand. This spring is made detachable from the lever, in order that the entire dash apparatus, including the central stem and bottom pan, may be easily and readily removed from the churn-case.

I am aware that it is not new to construct a churn in which the dasher-stems are provided with perforated connection-strips for adjusting the operating-lever, and that a central stem in a churn has been provided with a perforated butter-pan; and therefore only claim the precise manner in which my device is constructed.

Having described this invention, what I claim, and desire to secure by Letters Patent, is—

A double-acting reciprocating churn, consisting of the case A, having the interior ledges $a$, the sectional cover Z, the removable central stem, C, secured by its rigid base-piece to the butter-pan E, the adjustable lever L, the dasher-stems $s\ s$, and their connections $t\ t$, secured to the lever L, and the perforated dashers K K, one of which is recessed in its inner edge to receive the stem C, all combined and operating substantially as specified.

In testimony whereof I affix my signature in presence of two witnesses.

HENRY C. NEER.

Witnesses:
T. S. MATHER,
CHARLES H. SAMSON.